United States Patent

[11] 3,569,873

| [72] | Inventor | William D. Beaver |
| | | Costa Mesa, Calif. |
| [21] | Appl. No. | 776,497 |
| [22] | Filed | Nov. 18, 1968 |
| [45] | Patented | Mar. 9, 1971 |
| [73] | Assignee | Collins Radio Company |
| | | Dallas, Tex. |

[54] INSERTION LOSS EQUALIZATION DEVICE
9 Claims, 7 Drawing Figs.
[52] U.S. Cl............................................. 333/72,
333/76, 333/18.28
[51] Int. Cl............................................. H03h 9/00,
H03h 7/08
[50] Field of Search........................................... 333/22, 81,
72, 76, 18, 28, 28 (A), 32

[56] References Cited
UNITED STATES PATENTS
| 2,429,639 | 10/1947 | McSkimin | 333/72 |
| 2,948,866 | 8/1960 | Oswald | 333/28A |
| 3,426,300 | 2/1969 | Chun-Ho | 333/72 |

*Primary Examiner*—Herman Karl Saalbach
*Assistant Examiner*—Saxfield Chatmon, Jr.
*Attorneys*—Robert J. Crawford and Henry K. Woodward ABSTRACT: A loss equalization device comprising a piezoelectric quartz crystal plate with two pairs of metallic electrodes deposited thereon to form two coupled resonators. The structure is terminated in a resistance different from the midband impedance of the structure's passband so that there is more attenuation in the center of the passband than in the areas off the center. By cascading this device with a lossy, properly terminated filter, there is obtained a substantially flat frequency response curve.

Patented March 9, 1971

INVENTOR.
WILLIAM D. BEAVER
BY Donald W. Phillips
ATTORNEY

INVENTOR.
WILLIAM D. BEAVER
BY Donald W. Phillion
ATTORNEY

Patented March 9, 1971

INVENTOR
WILLIAM D. BEAVER

BY *Donald W. Phillion*
ATTORNEY

INSERTION LOSS EQUALIZATION DEVICE

This invention relates generally to loss equalization devices for use with narrowband filters and more particularly to a loss equalizing device comprising a misterminated monolithic crystal filter which adds loss to the center of the passband of a conventional filter with which it is used, and thereby equalizes the overall loss of the structure to provide a substantially flat frequency response characteristic over the passband.

One of the primary difficulties in realizing narrowband filters is the obtaining of a desired flatness of passband. A principal reason for such lack of flatness lies in the fact that the prior art filters are designed using insertion loss synthesizing techniques and utilizing lossless lumped network components. In the actual construction of such a filter, however, the components employed do have loss which causes an undesirable displacement of the poles away from the real frequency axis, with a resulting rounding of the corners of the passband characteristic. Such roundness of corners is of sufficient magnitude to prevent the filters from meeting the specifications of many applications, such as telephone channel requirements, for example.

There are two approaches widely used today for squaring-up the corners of the passband. One of these techniques is called "predistortion." The "predistortion" method of squaring the passband corners involves the displacing of the pole locations in the complex frequency plane back toward the real frequency axis such that the proper-shaped passband is achieved with lossy components. While this technique does provide an increased flatness of passband, it also results in a filter with very tight manufacturing tolerances and one which is quite sensitive to environmental changes. The aforementioned difficulties involved are serious enough to raise the manufacturing cost substantially and to introduce an element of unreliability that in many applications is not acceptable.

The second technique for equalizing loss is to provide an additional network in tandem with the filter network which adds loss to the center portion of the passband in amounts which will result in a substantially equal loss across the entire passband. It is a unique application of this latter technique which forms the basis of the present invention.

It is to be further noted that most prior art loss equalizing devices are relatively large compared to, and have frequency-temperature characteristics different from, the filter they are equalizing.

A primary object of the invention is to provide a simple, reliable and inexpensive loss equalization means.

A second purpose of the invention is to provide a loss equalization means comprising a monolithic crystal structure and having the same temperature frequency characteristic of the filter it is equalizing.

A third object of the invention is to provide an adjustable loss equalizing device comprising a misterminated two-pole monolithic crystal filter.

A fourth object of the invention is to provide a small and compact loss equalizer device.

A fifth object of the invention is the improvement of loss equalizers generally.

In accordance with the invention a crystal plate has formed thereon two pairs of electrodes, which form two resonators coupled together through the connecting portion of the quartz crystal plate. This resultant two-pole monolithic crystal filter structure has two passbands and can be represented by a lattice-type equivalent circuit. The lower passband is utilized in the present invention and has a certain image impedance. By terminating the equalization device in a resistance different from the midband image impedance the resultant response curve will be caused to have more attenuation in the passband center than at those frequencies in that portion of the passband 10 percent to 40 percent out from the center thereof. B By proper mistermination, the frequency response curve of the equalization device can be made to approximate a mirror image of the filter being compensated, i.e., the conventional prior art filter described above with the undesirable rounded corners. Thus when the loss equalization device and the filter are cascaded, the resultant frequency response curve will be considerably flatter than that of either filter alone.

In accordance with a feature of the invention, the terminating resistor of the equalizer is made variable so that it can be adjusted to provide the proper degree of mistermination and the proper loss characteristic.

The above-mentioned and other objects and features of the invention will be more fully understood from the following detailed description thereof when read in conjunction with the drawings in which.

Figure 1:
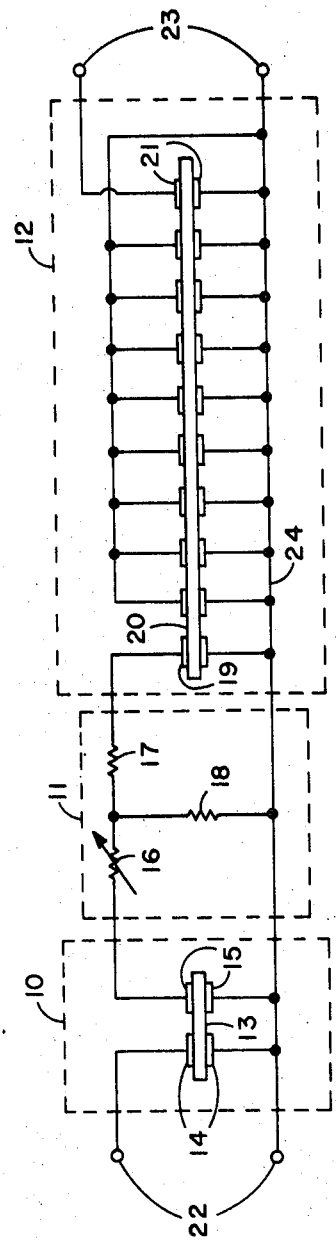
FIG. 1 is a schematic diagram showing the loss equalization device of the present invention cascaded with a monolithic crystal filter whose loss is being equalized.

Referring now to FIG. 1, there is shown a diagram of a structure including filter 12 comprising 10 resonators formed on a single, quartz crystal plate 20, a loss equalizing device 10 comprising two pairs of electrodes 14 and 15 formed on a single quartz crystal plate 13, and thirdly, a terminating impedance means 11 consisting of a tunable loss pad having three resistors 16, 17, and 18, with resistor 16 being adjustable.

The input signal can be supplied at either end of the structure of FIG. 1, and more specifically to either the terminals 22 or the terminals 23. The other pair of terminals becomes the output terminals.

Assume for purposes of discussion that the terminals 22 are the input terminals. The signal then passes through the loss equalizing device 10, which is terminated in resistor pad 11. In pad 11 the impedance presented to the loss equalizing device 10 is determined primarily by variable resistor 16 and resistor 18. Resistor 16 is made variable in order to provide a means for tuning the terminating impedance presented to device 10 to the particular mismatch required to provide the proper loss equalization characteristics for any given filter 12. More specifically, different filters will have slightly different frequency response characteristics. In order to provide the most optimum loss equalization for each filter the resistor 16 is made variable.

The impedance presented to filter 12 is determined primarily by resistors 17 and 18 and ordinarily is equal to the design impedance of filter 12.

It is to be noted that both the loss equalization device 10 and the filter 12 are comprised of a quartz crystal plate having a plurality of pairs of electrodes coated thereon. The energy is transferred from resonator to resonator through the crystal due to both the mechanical and the electrical characteristic of the crystal in a manner well-known in the art.

Figure 4:
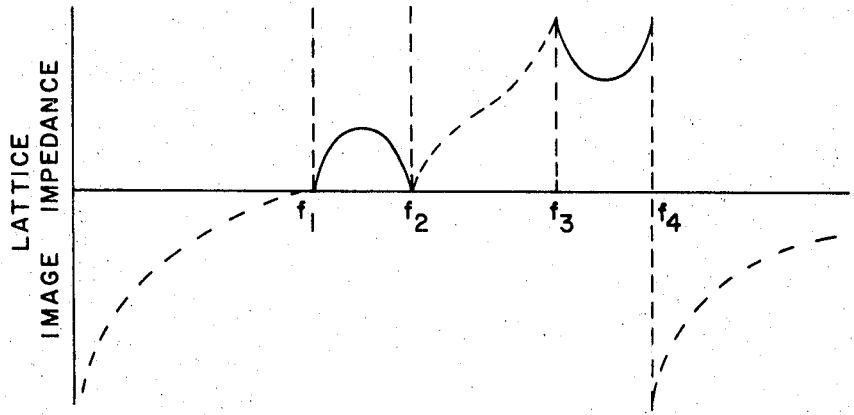
FIG. 4 is a curve showing the frequency vs. lattice image impedance characteristic of the circuit of FIG. 2.
Figure 4A:
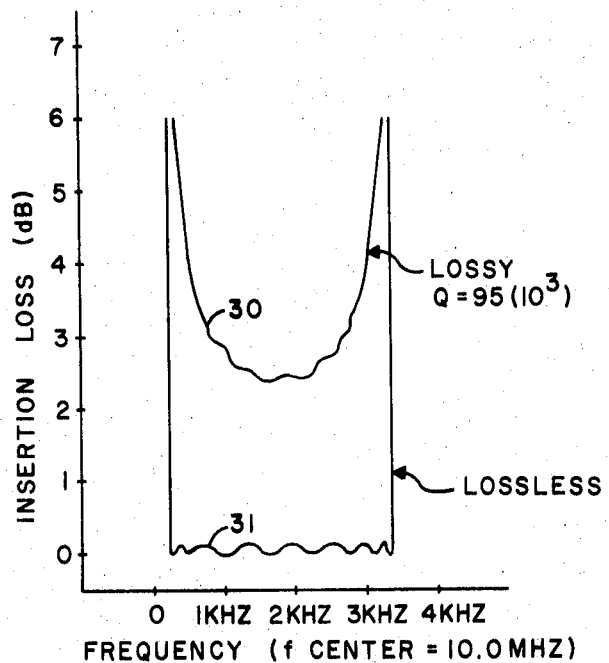
FIG. 4a are curves showing the frequency response curve obtainable theoretically with lossless components and that obtainable practically with lossy components.

As discussed generally above, crystal filter 12 is constructed of components which contain losses and which result in the frequency response characteristic represented by curve 30 of FIG. 4a, as compared with the flatter frequency response curve 31 which would be obtained if the elements of the crystal filter were lossless. The addition of the loss equalization circuit 10 of FIG. 1 adds loss to the center portion of curve 30 of FIG. 4a to produce a substantially flat frequency response curve as shown generally in FIG. 6.

Figure 2:
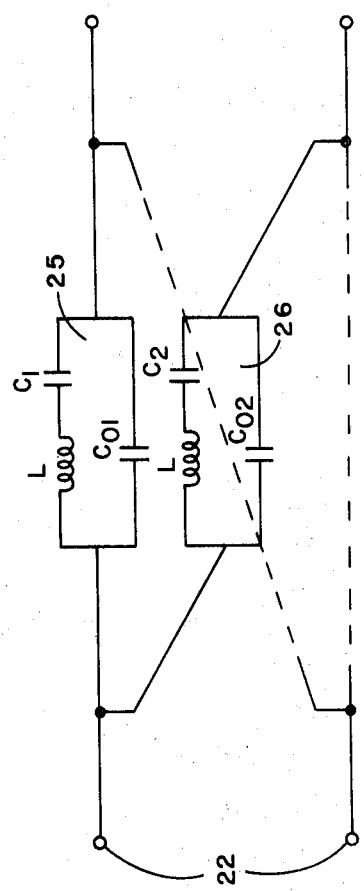
FIG. 2 is a lattice-type equivalent circuit of the loss equalization device.
Figure 3:
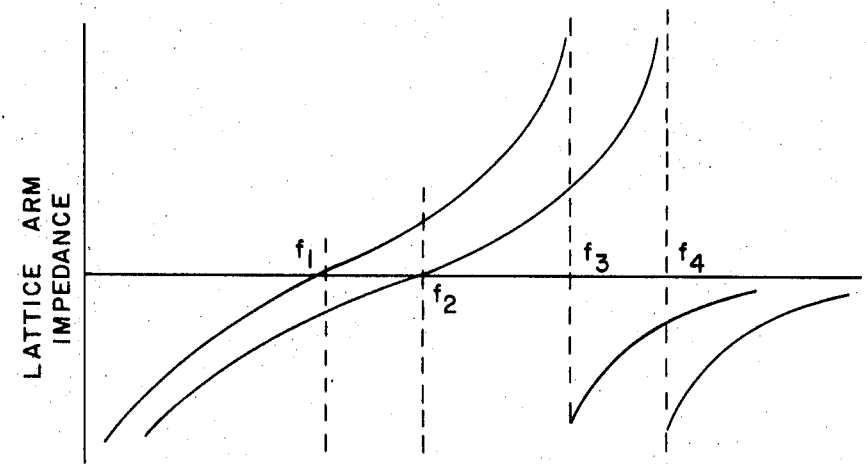
FIG. 3 are curves showing the frequency vs. reactive characteristics of the series and crossarms of the lattice circuit of FIG. 2.

The operation of loss equalizer device 10 can be better understood by considering its equivalent lattice-type circuit shown in FIG. 2, which has the frequency vs. lattice arm impedance characteristics shown in FIG. 3, and the frequency vs. lattice image impedance characteristics of FIG. 4. It can be seen from FIGS. 3 and 4 that the lattice-type network of FIG. 2 has two passbands, the lower passband occurring between frequencies $f_1$ and $f_2$ and the higher passband occurring between frequencies $f_3$ and $f_4$.

The equations giving the impedance for both passbands of a two-pole monolithic crystal filter, having the lattice equivalent circuit shown in FIG. 2, are as follows: $f_1 f_4 = f_2 f_3$, by definition (1)

$f_1 f_3 = f^2_{ma}$, by definition (2)

$f_2 f_4 = f^2_{mb}$, by definition (3) where $f_{ma}$ and $f_{mb}$ are the midband frequencies of the lower and upper passbands, respectively.

Then by well known principles:

$$R_{oa} = \frac{1}{2 f_{ma} C_o} \left[ \frac{(f_{ma}^2 - f_1^2)(f_{ma}^2 - f_3^2)}{(f_{ma}^2 - f_2^2)(f_{ma}^2 - f_4^2)} \right]^{1/2} \quad (4)$$

$$R_{ob} = \frac{1}{2 f_{mb} C_o} \left[ \frac{(f_{mb}^2 - f_1^2)(f_{mb}^2 - f_3^2)}{(f_{mb}^2 - f_2^2)(f_{mb}^2 - f_4^2)} \right]^{1/2} \quad (5)$$

Where $R_{oa}$ and $R_{ob}$ are respectively the image impedances of the filter at $f_{ma}$ and $f_{mb}$.

Expressions (4) and (5) for narrow bandwidth filters may be approximated in the following manner:

$$R_{oa} \cong \frac{1}{2\pi C_o} \frac{(f_3 - f_1)}{(f_2 f_4 - f_1 f_3)} \cong 2\pi L (f_3 - f_1) \quad (6)$$

and $$R_{ob} \cong \frac{1}{2\pi C_o} \frac{(f_2 f_4 - f_1 f_3)}{f_2 f_4 (f_4 - f_2)} \quad (7)$$

The ratio of the two impedances $R_{oa}$ and $R_{ob}$ is as follows:

$$\frac{R_{ob}}{R_{oa}} = \frac{4(f_{mb} - f_{ma})^2}{(f_3 - f_1)^2} \quad (8)$$

This results in a ratio of about 700 for a filter having a bandwidth of 3 kHz. at 10 MHz. When the filter is terminated for the lower passband, the upper band will not be observable in the output and need not be considered. It is necessary to consider only distortion which is induced in the lower passband by the mistermination.

Figure 5:
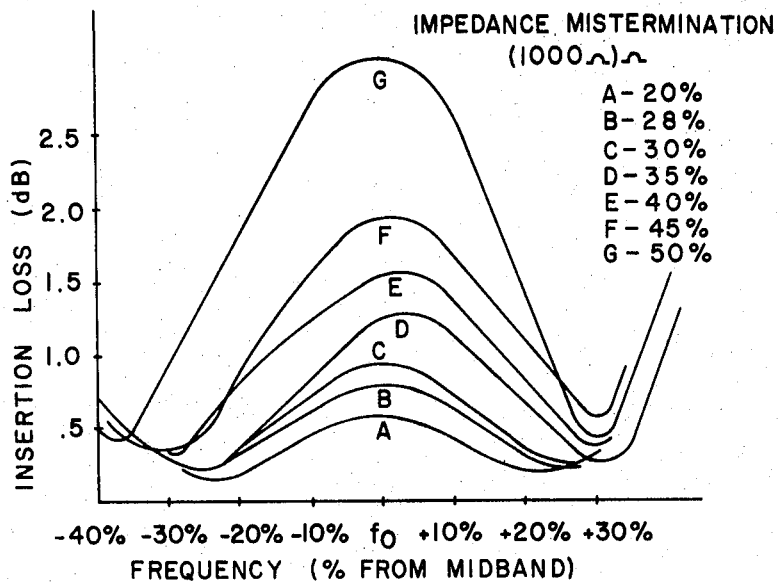
FIG. 5 is a family of frequencies vs. attenuation curves of the loss equalization device with various degrees of mistermination.

The amount of such induced distortion as a function of mistermination is shown in the family of curves of FIG. 5. As the termination is lowered in value, which increases the mismatch, the induced distortion is increased. It is apparent from the curves of FIG. 5 that is is possible to equalize the loss of filters that have variations in $Q$ merely by trimming the terminating resistor.

From the foregoing equations and discussions, the following design procedure can be formulated:

1. Firstly, the amount of equalization required is obtained by an inspection of the shape of the passband distortion of the filter to be equalized;
2. From FIG. 3, the data for which has been previously obtained by testing of a loss equalizer device, the physical parameter required to obtain the proper equalizer bandwidth is determined;
3. The equalizer is then designed with an impedance suitable for tandem connection with the filter which is to be compensated;
4. The completed network, including the filter and the loss equalizer, is then tested to determine if the proper amount of equalization is accomplished;
5. If the proper equalization has not been obtained, the distortion of the loss equalizer is tuned by adjustment of a resistor corresponding to the resistor 16 of FIG. 1, for example, until optimum flatness of the response curve is obtained.

Figure 6:
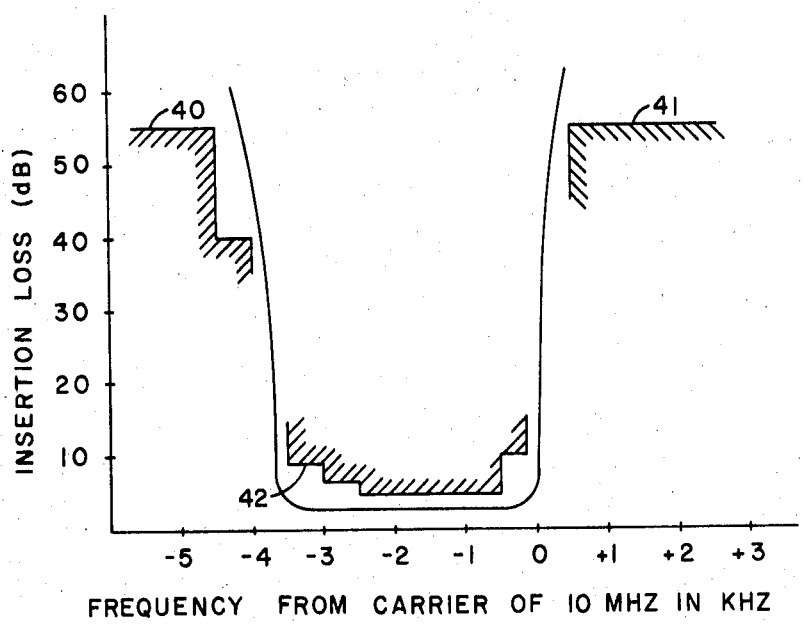
FIG. 6 is a curve of frequency vs. impedance of a combination of the present invention cascaded with a 10-pole crystal filter.

An example of equalizing loss with the filter of FIG. 1 is shown in FIG. 6. More specifically, in FIG. 6, there is shown the overall frequency response curve of the composite filter structure including a 10-pole multicrystal filter and a 2-pole monolithic crystal filter forming the equalizer. The hatched rectangular lines 40, 41 and 42 of FIG. 6 represent a typical set of specifications which the frequency response curve must meet, i.e. must fall within.

I claim:

1. A loss equalizer device for equalizing the loss of a conventional filter over a given passband and comprising:
    crystal plate means;
    first and second pairs of electrodes coated on said crystal plate with each pair of electrodes comprising a coated area on substantially coinciding opposite sides of said crystal plate;
    a pair of input terminals connected to said first pair of electrodes;
    a misterminated impedance means having an impedance different from the midband impedance of said device connected to said second pair of electrodes to provide greater loss at the center of said passband than at points within said passband and near the shoulders thereof;
    and means for cascading said loss equalizer with said conventional filter.

2. A loss equalizer device in accordance with claim 1 in which said means for cascading said loss equalizer with said conventional filter comprises:
    T network means comprising first, second, and third resistive means forming the left half of the crossbar of the T network, the right half of the crossbar of the T network, and the leg of the T network, respectively;
    said first and third resistive means comprising said misterminated impedance means and being connected across said second pair of electrodes; and
    said second and third resistive means comprising the coupling impedance to said conventional filter.

3. A loss equalizer device in accordance with claim 1 in which:
    said pairs of electrodes are positioned a given distance apart and form a pair of resonators coupled together through that portion of the crystal plate lying therebetween;
    said given distance being sufficient to substantially isolate each resonator one from the other with respect to electrical coupling but sufficiently close to permit mechanical coupling between said resonators.

4. A loss equalizer device in accordance with claim 3 in which said means for cascading said loss equalizer with said conventional filter comprises:
    T network means comprising first, second, and third resistive means forming the left half of the crossbar of the T network, the right half of the crossbar of the T network, and the leg of the T network, respectively;
    said first and third resistive means comprising said misterminated impedance means and being connected across said second pair of electrodes; and
    said second and third resistive means comprising the coupling impedance to said conventional filter.

5. In combination with a crystal filter having a pair of input terminals and a passband with rounded corners and a terminating impedance $Z_1$, a loss equalizer device comprising:
    crystal plate means;
    at least two pairs of electrodes on said crystal plate with the two electrodes of each pair being positioned coincidentally on opposite sides of said crystal plate;
    a pair of terminals connected to a first pair of said two pairs of electrodes; and
    two port terminating impedance means having the first port connected to said crystal filter and presenting an impedance substantially equal to $Z_1$ thereto, and the second port connected to the second pair of electrodes of said loss equalizer device and presenting an impedance $Z_2$ thereto, which impedance $Z_2$ constitutes a mismatch with said loss equalizer device to provide a greater loss at the center of said passband than at points within said passband but near the shoulders thereof.

6. The combination in accordance with claim 5 in which:

said two port terminating impedance means comprises first, second, and third resistive means forming the left half of the crossbar, the right half of the crossbar, and the leg of a T network pad, respectively;

said second pair of electrodes of said loss equalizer device being connected across first and third resistive means; and said input terminals of said crystal filter being connected across said second and third resistive means.

7. The combination in accordance with claim 5 in which:

said pairs of electrodes are positioned a given distance apart and form a pair of resonators coupled together through that portion of the crystal plate lying therebetween;

said given distance being sufficient to substantially isolate each resonator one from the other with respect to electrical coupling but sufficiently close to permit mechanical coupling between said resonators.

8. The combination in accordance with claim 7 in which:

said two port terminating impedance means comprises first, second, and third resistive means forming the left half of the crossbar, the right half of the crossbar, and the leg of a T network pad, respectively;

said second pair of electrodes of said loss equalizer device being connected across said first and third resistive means; and said input terminals of said crystal filter being connected across said second and third resistive means.

9. In a system utilizing conventional filter means having input and output means and a given frequency passband, a loss equalizer device for equalizing the loss of said conventional filter over said given passband and comprising:

crystal plate means;

first and second pairs of electrodes coated on said crystal plate with each pair of electrodes comprising a coated area on substantially coinciding opposite sides of said crystal plate;

a pair of input terminals connected to said first pair of electrodes;

a misterminated impedance means having an impedance different from the midband impedance of said device connected to said second pair of electrodes to provide greater loss at the center of said passband than at points within said passband and near the shoulders thereof;

and means for cascading said loss equalizer device with said conventional filter means and comprising two port impedance means constructed to present first and second impedances $Z_1$ and $Z_t$ o its first and second ports, respectively;

said first port being connected to the output means of said conventional filter means; and said second port being connected to the input terminals of said loss equalizer device and comprising said misterminated impedance for said loss equalizer device.